United States Patent [19]

Tanimoto

[11] Patent Number: 4,593,949

[45] Date of Patent: Jun. 10, 1986

[54] LOWER BODY CONSTRUCTION FOR MOTOR VEHICLE

[75] Inventor: Tsutomu Tanimoto, Hiroshima, Japan

[73] Assignee: Mazda Motor Corporation, Hiroshima, Japan

[21] Appl. No.: 655,075

[22] Filed: Sep. 27, 1984

[30] Foreign Application Priority Data

Sep. 28, 1983 [JP] Japan .............................. 58-151844[U]
Sep. 28, 1983 [JP] Japan .............................. 58-151846[U]

[51] Int. Cl.⁴ ............................................. B62D 25/20
[52] U.S. Cl. .................................. 296/204; 296/209; 296/188
[58] Field of Search ............... 296/204, 209, 193, 203, 296/185, 188

[56] References Cited

U.S. PATENT DOCUMENTS 3,162,478 12/1964 Richards .................. 296/204
3,321,235 5/1967 Müller et al. ............ 296/204
4,014,587 3/1977 Eggart ...................... 296/204
4,129,330 12/1978 Schwuchow .............. 296/204
4,402,545 9/1983 Utsunomiya ............. 296/204

FOREIGN PATENT DOCUMENTS 2426050 1/1975 Fed. Rep. of Germany ...... 296/204

Primary Examiner—Robert R. Song
Attorney, Agent, or Firm—Burns, Doane, Swecker and Mathis

[57] ABSTRACT

A lower body construction for a motor vehicle, including a pair of side sills, a floor panel attached to the side sills and formed with a tunnel portion, and a pair of cross members each having a hat-shaped cross section and provided on the floor panel. A pair of recesses are, respectively, formed at opposite sides of the floor panel, while an outer end of each of the cross members is spaced slightly away from each of the side sills inwardly, whereby a reinforcement member having the hat-shaped cross section and extending continuously between the tunnel portion and each of the side sills is constituted by each of the cross members and each of the recesses.

4 Claims, 7 Drawing Figures

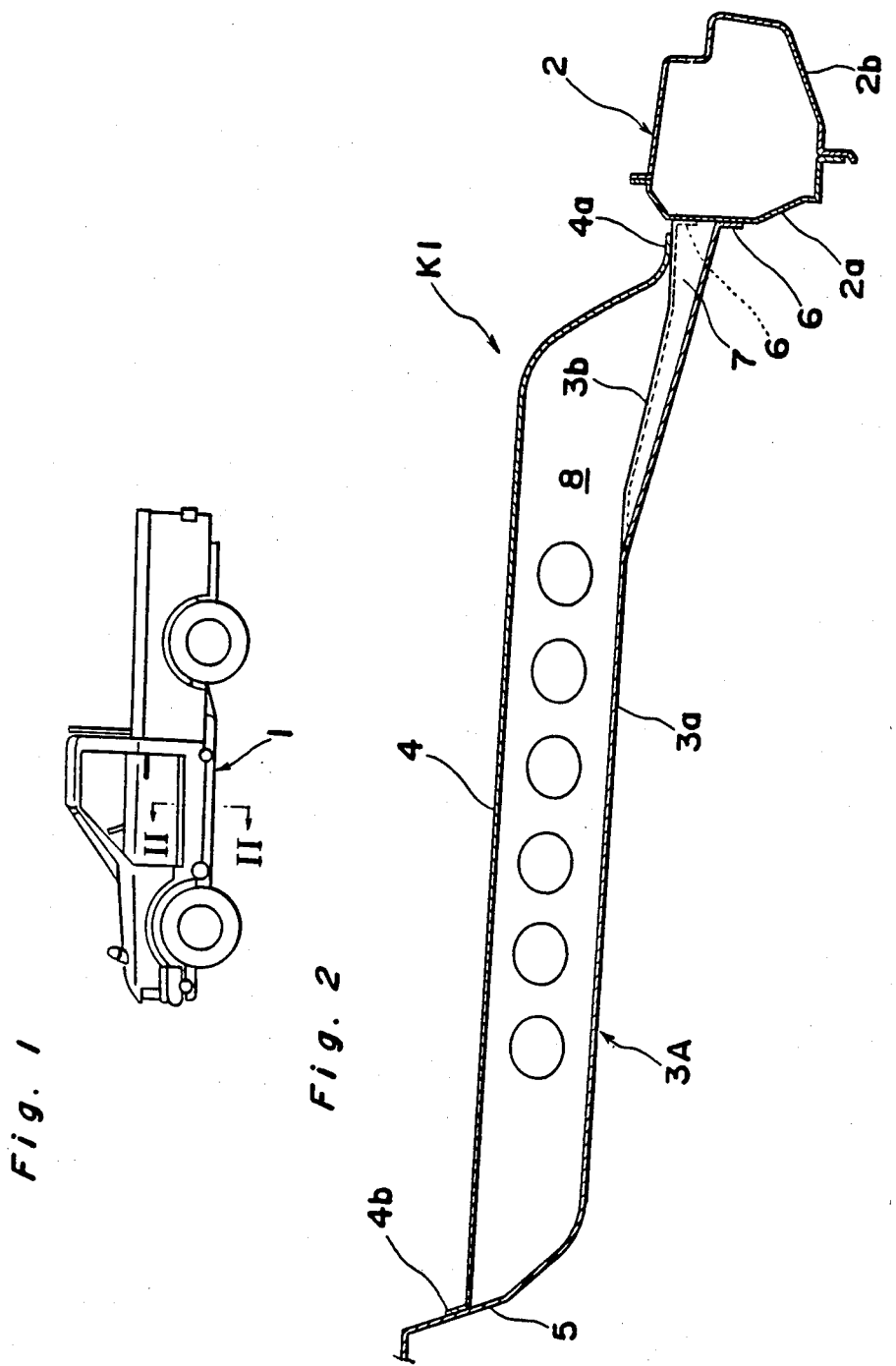

LOWER BODY CONSTRUCTION FOR MOTOR VEHICLE

FIELD OF THE INVENTION

The present invention generally relates to motor vehicles and more particularly, to a lower body construction for a motor vehicle.

BACKGROUND OF THE INVENTION

Conventionally, in lower body constructions for motor vehicles, it has been so arranged as disclosed in, for example, Japanese Utility Model Laid-Open Publication No. 10974/1982 (Jikkaisho 57-10974) that a pair of cross members are provided on a floor panel having a tunnel portion formed at a central portion thereof in a widthwise direction of a body such that opposite ends of each of the cross members are attached to the tunnel portion and each of opposite side sills, respectively. However, in the case where the prior art lower body constructions are applied to a body construction of a motor vehicle, for example, a cabin floor of a motor truck, in which the floor panel is attached to upper end portions of the side sills, such a problem arises that since it becomes impossible to attach the outer end of each of the cross members to each of the side sills, the lower body construction of the motor truck has insufficient strength in the widthwise direction of the body.

Meanwhile, a lower body construction provided with a drain device for draining electrodeposition liquid after electrodeposition coating is proposed in, for example, Japanese Utility Model Laid-Open Publication No. 121378/1982 (Jikkaisho 57-121378). However, this known lower body construction has such a disadvantage that the drain device is complicated in structure.

OBJECTS AND SUMMARY OF THE INVENTION

Accordingly, an essential object of the present invention is to provide an improved lower body construction for a motor vehicle, which has high rigidity in a widthwise direction of a body of the motor vehicle without attaching each of outer ends of a pair of cross members to each of opposite side sills, with substantial elimination of the disadvantages inherent in conventional lower body constructions of this kind.

Another important object of the present invention is to provide an improved lower body construction of the above described type in which a drain device of a simplified structure is provided.

In accomplishing these and other objects according to one preferred embodiment of the present invention, there is provided an improved lower body construction for a motor vehicle, comprising: a pair of first and second side sills which are, respectively, disposed at opposite sides of a body of said motor vehicle so as to extend in a longitudinal direction of said body; a floor panel which is attached, at opposite first and second side edges thereof, to said first and second side sills, respectively so as to be disposed between said first and second side sills and is formed, at a substantially central portion thereof in a widthwise direction of said body, with a tunnel portion extending in the longitudinal direction of said body so as to be divided into a pair of first and second floor panel parts by said tunnel portion such that said first and second floor panel parts are, respectively, provided with said first and second side edges; and a pair of first and second cross members each having a hat-shaped cross section, which are provided on said first and second floor panel parts, respectively so as to extend in the widthwise direction of said body; said first cross member being attached, at an inner end portion thereof, to said tunnel portion and being attached, at an outer end portion thereof, to said first floor panel part such that said outer end portion of said first cross member is spaced slightly away from said first side sill inwardly in the widthwise direction of said body; said first floor panel part being formed, in the vicinity of said outer end portion of said first cross member, with a first recess extending downwardly obliquely to said first side edge in the widthwise direction of said body; said second cross member being attached, at an inner end portion thereof, to said tunnel portion and being attached, at an outer end portion thereof, to said second floor panel part such that said outer end portion of said second cross member is spaced slightly away from said second side sill inwardly in the widthwise direction of said body; said second floor panel part being formed, in the vicinity of said outer end portion of said second cross member, with a second recess extending downwardly obliquely to said second side edge in the widthwise direction of said body, whereby a pair of first and second reinforcement members each having the hat-shaped cross section are, respectively, constituted by said first cross member and said first recess and by said second cross member and said second recess so as to extend continuously between said tunnel portion and said first side wall and between said tunnel portion and said second side sill, respectively in the widthwise direction of said body.

In accordance with the present invention, the lower body construction of the motor vehicle has been remarkably improved in rigidity against impact loads oriented in the widthwise direction of the body.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a side elevational view of a motor truck in which a lower body construction according to the present invention is incorporated, FIG. 2 is a fragmentary cross-sectional view taken along the line II—II in FIG. 1, particularly showing a lower body construction according to a first embodiment of the present invention;

Before the description of the present invention proceeds, it is to be noted that like parts are designated by like reference numerals throughout several views of the accompanying drawings.

DETAILED DESCRIPTION OF THE PREFERRED EMBODIMENTS

Figure 3:
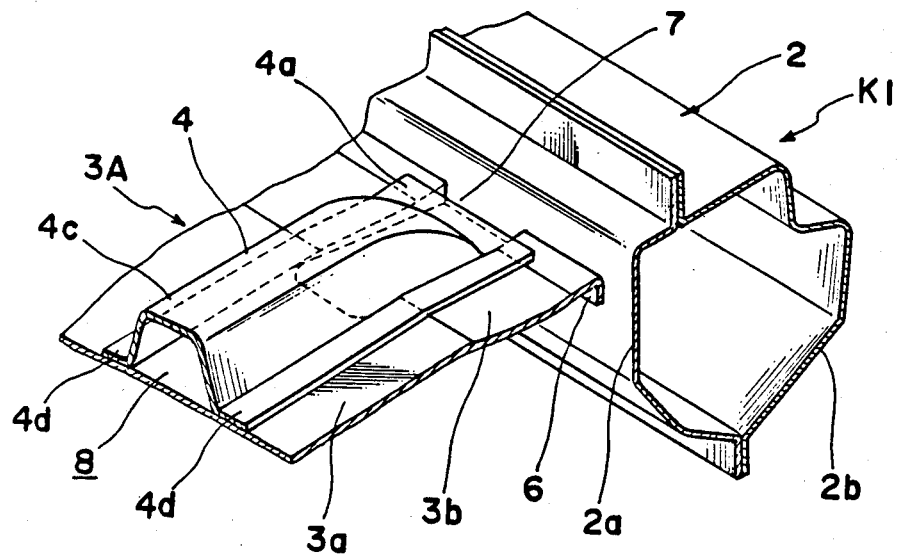
FIG. 3 is a fragmentary broken perspective view of the lower body construction of FIG. 2.

Referring now to the drawings, there is shown in FIG. 1, a motor truck having a cabin 1 to which a lower body construction K1 according to a first embodiment of the present invention may be applied.

Figure 4:
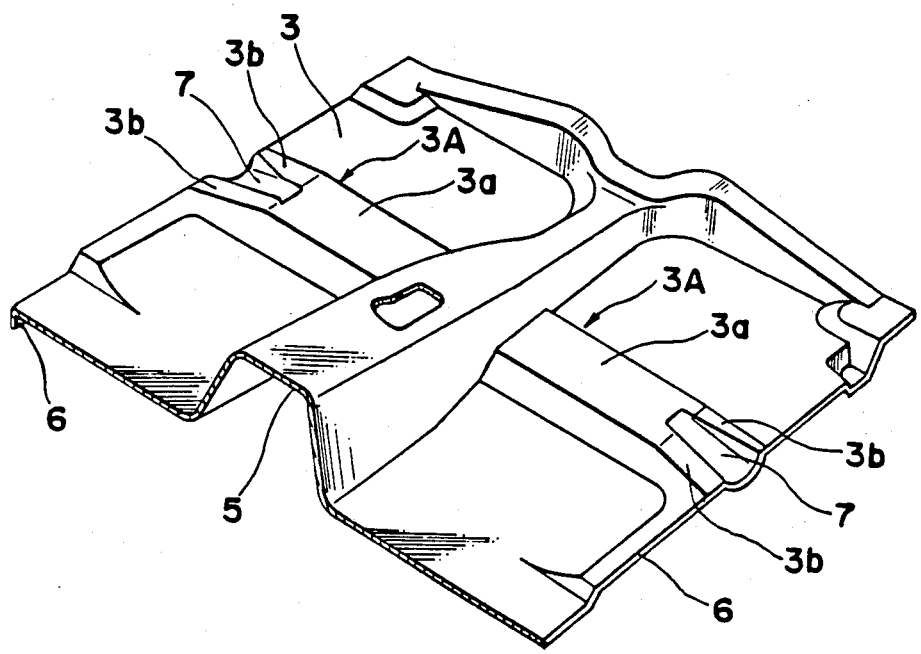
FIG. 4 is a perspective view of a floor panel employed in the lower body construction of FIG. 2 with the cross members removed.

As shown in FIGS. 2 to 4, the lower body construction K1, namely a floor portion of the cabin 1 includes a pair of side sills 2 disposed at opposite sides of a body of the motor truck and extending in a longitudinal direction of the body, a floor panel 3 attached, at opposite side edges thereof, to the side sills 2, respectively and a pair of cross members 4 provided on the floor panel 3. Each of the side sills 2 is constituted by an inner side sill 2a and an outer side sill 2b attached to each other. Meanwhile, the floor panel 3 has a tunnel portion 5 formed at a central portion thereof in a widthwise direction of the body and extending in the longitudinal direction of the body. The floor panel 3 is further formed with a pair of mounting portions 3A for mounting the cross members 4 thereon, respectively. The mounting portions 3A have hat-shaped cross sections and are formed in the floor panel 3 so as to extend oppositely from the tunnel portion 5 to the opposite side edges of the floor panel 3, respectively in the widthwise direction of the body. Since the lower body construction K1 is symmetrical with respect to the tunnel portion 5, only one side of the lower body construction K1 will be described for the sake of brevity, hereinbelow.

The floor panel 3 has a pair of flanges 6 formed at the opposite side edges thereof such that each of the flanges 6 is attached to an upper portion of a side face of the inner side sill 2a. Each of the cross members 4 is formed into a hat-shaped cross section having a crown portion 4c and a pair of brim portions 4d and is attached, at an inner end portion 4b thereof, to one of said faces of the tunnel portion 5 of the floor panel 3. It is to be noted that an outer end portion 4a of each of the cross members 4 is not attached to each of the side sills 2 but is attached to an upper face of each of the mounting portions 3A of the floor panel 3 so as to be spaced slightly away from each of the side sills 2 inwardly in the widthwise direction of the body.

Meanwhile, each of the mounting portions 3A has a recess 7 formed in the vicinity of the outer end portion 4a of each of the cross members 4 and extending downwardly obliquely to each of the flanges 6. Each of the mounting portions 3A further has a flat raised portion 3a and a pair of inclined portions 3b formed adjacent to the recess 7 and extending downwardly obliquely from the raised portion 3a to each of the flanges 6 such that the recess 7 is interposed between the inclined portions 3b. Thus, a reinforcement portion 8 having the hat-shaped cross section is constituted by each of the cross members 4 and the recess 7 of each of the mounting portions 3A of the floor panel 3 so as to extend continuously between the tunnel portion 5 and each of the side sills 2 in the widthwise direction of the body. The reinforcement portion 8 increases rigidity of each of the mounting portions 3A so as to increase rigidity of the lower body construction K1 in the widthwise direction of the body.

Figure 5:
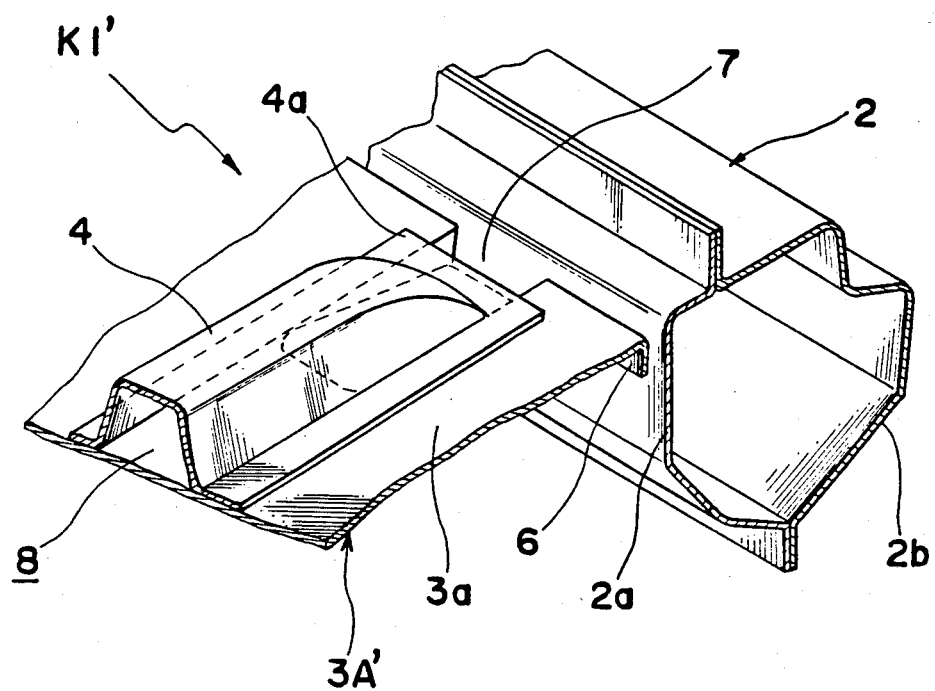
FIG. 5 is a view similar to FIG. 3, particularly showing a modification thereof.

Referring to FIG. 5, there is shown a lower body construction K1' which is a modification of the lower body construction K1. In the modified lower body construction K1', each of the mounting portions 3A is replaced by a mounting portion 3A'. The mounting portion 3A' does not include the inclined portions 3b and is constituted by only the flat raised portion 3a.

Figure 6:
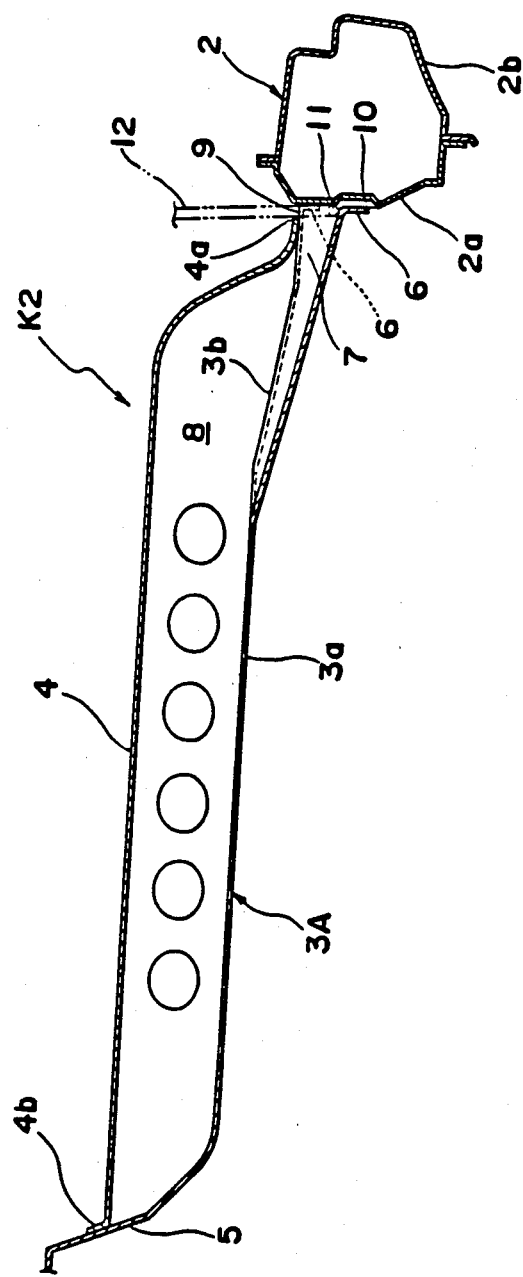
FIGS. 6 and 7 are views similar to FIGS. 2 and 3, respectively, particularly showing a lower body construction according to a second embodiment of the present invention.
Figure 7:
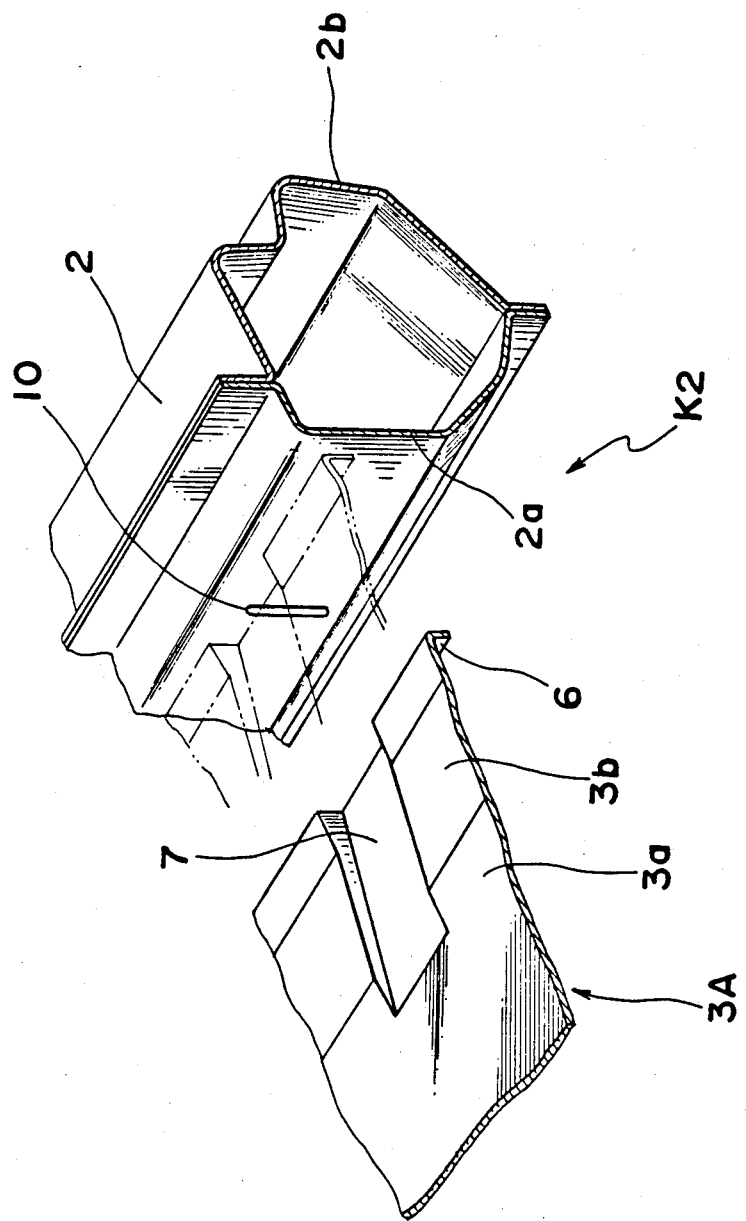

Referring further to FIGS. 6 and 7, there is shown a lower body construction K2 according to a second embodiment of the present invention. In the lower body construction K2, an opening 9 is defined above the recess 7 and between the outer end portion 4a of each of the cross members 4 and each of the side sills 2. Moreover, in the lower body construction K2, the inner side sill 2a has a groove 10 formed at a joint portion thereof between the inner side sill 2a and each of the flanges 6 of the floor panel 3 and extending in a vertical direction of the body such that the recess 7 is communicated, through the groove 10, with a space disposed below the joint portion. The groove 10 is used for draining therethrough electrodeposition liquid collected on the floor panel 3 after electrodeposition coating. Meanwhile, sealer 11 is filled into the groove 10 from the recess 7 so as to seal the groove 10. A portion of sealer filled into the joint portion between the inner side sill 2a and each of the flanges 6 of the floor panel 3 is usually used as the sealer 11. Since a nozzle of a sealer gun 12 can be easily inserted from the opening 9 into the recess 7, it becomes possible to fill the sealer 11 into the groove 10 with much ease.

Since other constructions of the modified lower body construction K1' and the lower body construction K2 are similar to those of the lower body construction K1, detailed description thereof is abbreviated for the sake of brevity.

In accordance with the present invention, since each of the cross members of the hat-shaped cross section provided on the floor panel is spaced slightly away from each of the side sills inwardly in the widthwise direction of the body and the floor panel is formed, in the vicinity of the outer end portion of each of the cross members, with the recess extending downwardly obliquely to each of the opposite side edges of the floor panel attached to the side sills, the reinforcement portion of the hat-shaped cross section is constituted by each of the cross members and each of the recesses of the floor panel so as to extend continuously between the tunnel portion of the floor panel and each of the side sills, so that the lower body construction has been remarkably improved in rigidity against impact loads oriented in the widthwise direction of the body, whereby the rigid lower body construction can be obtained.

Furthermore, in accordance with the present invention since each of the side sills is formed, at the joint portion between each of the side sills and the floor panel, with the groove communicating each of the recesses of the floor panel and the space disposed below the joint portion, it becomes possible to drain electrodeposition liquid through the groove after electrodeposition coating with much ease.

Moreover, in accordance with the present invention, in the case where sealer is filled into the groove from each of the recesses of the floor panel so as to seal the groove, the sealer can be easily filled into the groove through the opening defined above each of the recesses of the floor panel and between the outer end portion of each of the cross members and each of the side sills. Thus, when the groove has been sealed by the sealer, it becomes possible to prevent entry of water into each of the recesses of the floor panel through the groove from outside of each of the recesses of the floor panel.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A lower body construction for a motor vehicle, comprising:

a pair of first and second side sills which are, respectively, disposed at opposite sides of a body of said motor vehicle so as to extend in a longitudinal direction of said body;

a floor panel which is attached, at opposite first and second side edges thereof, to said first and second side sills, respectively, so as to be disposed between said first and second side sills and is formed, at a substantially central portion thereof in a widthwise direction of said body, with a tunnel portion extending in the longitudinal direction of said body so as to be divided into a pair of first and second floor panel parts by said tunnel portion such that said first and second floor panel parts are, respectively, provided with said first and second side edges; and a pair of first and second cross members each having a hat-shaped cross section, which are provided on said first and second floor panel parts, respectively, so as to extend in the widthwise direction of said body;

said first cross member being attached, at an inner end portion thereof, to said tunnel portion and being attached, at an outer end portion thereof, to said first floor panel part such that said outer end portion of said first cross member is spaced from said first side sill inwardly in the widthwise direction of said body;

said first floor panel part being formed, in the vicinity of said outer end portion of said first cross member, with a first recess extending downwardly obliquely to said first side edge in the widthwise direction of said body;

said second cross member being attached, at an inner end portion thereof, to said tunnel portion and being attached, at an outer end portion thereof, to said second floor panel part such that said outer end portion of said second cross member is spaced from said second side sill inwardly in the widthwise direction of said body;

said second floor panel part being formed, in the vicinity of said outer end portion of said second cross member, with a second recess extending downwardly obliquely to said second side edge in the widthwise direction of said body, whereby a pair of first and second reinforcement portions each having the hat-shaped cross section are, respectively, constituted by said first cross member and said first recess and by said second cross member and said second recess so as to extend continuously between said tunnel portion and said first side sill and between said tunnel portion and said second side sill, respectively, in the widthwise direction of said body;

said first and second floor panel parts including, respectively, first and second mounting portions having hat-shaped cross sections;

said first and second cross members are, respectively, provided on said first mounting portion of said first floor panel part and said second mounting portion of said second floor panel part.

2. A lower body construction as claimed in claim 1, wherein said first and second mounting portions are formed, at said first and second side edges, with first and second inclined portion extending downwardly obliquely to said first and second side edges in the widthwise direction of said body, respectively such that said first and second recesses are, respectively, formed on said first and second inclined portions.

3. A lower body construction as claimed in claim 2, wherein said first and second cross members are attached, at said outer end portion of said first cross member and said outer end portion of said second cross member, to said first and second inclined portions so as to cover said first and second recesses, respectively.

4. A lower body construction as claimed in claim 1, wherein said first side sill is formed, at a first joint portion thereof between said first side sill and said first side edge of said floor panel, with a first drain groove communicating said first recess and a space disposed below said first joint portion, said second side sill being formed, at a second joint portion thereof between said second side sill and said second side edge of said floor panel, with a second drain groove communicating said second recess and a space disposed below said second joint portion.

* * * * *